(12) United States Patent
Cho et al.

(10) Patent No.: US 8,164,820 B2
(45) Date of Patent: Apr. 24, 2012

(54) DISPLAY DEVICE

(75) Inventors: Don-Chan Cho, Seongnam-si (KR); Jae-Byung Park, Seongnam-si (KR); Hae-Il Park, Seoul (KR); Jin-Seob Byun, Seoul (KR); Sung-Jin Hong, Seoul (KR); Seul Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 365 days.

(21) Appl. No.: 12/188,884

(22) Filed: Aug. 8, 2008

(65) Prior Publication Data

US 2009/0109517 A1    Apr. 30, 2009

(30) Foreign Application Priority Data

Oct. 29, 2007 (KR) .................. 10-2007-0108748

(51) Int. Cl.
G02B 26/00 (2006.01)
(52) U.S. Cl. ...................................... 359/290
(58) Field of Classification Search .......... 359/290–297; 385/39–40
See application file for complete search history.

(56) References Cited

U.S. PATENT DOCUMENTS

| | | | |
|---|---|---|---|
| 5,771,321 A | 6/1998 | Stern | |
| 6,972,881 B1 | 12/2005 | Bassetti | |
| 7,187,489 B2 | 3/2007 | Miles | |
| 7,345,418 B2 * | 3/2008 | Nagatomi et al. | 313/503 |
| 2002/0126364 A1 | 9/2002 | Miles | |
| 2005/0123243 A1 * | 6/2005 | Steckl et al. | 385/40 |
| 2006/0028708 A1 | 2/2006 | Miles | |
| 2006/0077533 A1 | 4/2006 | Miles et al. | |
| 2007/0058095 A1 | 3/2007 | Miles | |
| 2007/0097134 A1 | 5/2007 | Miles | |
| 2007/0121118 A1 | 5/2007 | Gally et al. | |

FOREIGN PATENT DOCUMENTS

| | | |
|---|---|---|
| JP | 2005-062815 | 3/2005 |
| JP | 2006-099061 | 4/2006 |
| JP | 2006-099070 | 4/2006 |
| JP | 2006-099087 | 4/2006 |
| JP | 2006-099106 | 4/2006 |
| JP | 2006-099113 | 4/2006 |
| JP | 2006-106756 | 4/2006 |
| JP | 2006-133744 | 5/2006 |
| KR | 2002-0010322 | 2/2002 |
| KR | 2004-0035678 | 4/2004 |
| KR | 2006-0092915 | 8/2006 |
| KR | 2006-0131778 | 12/2006 |
| KR | 2007-0035089 | 3/2007 |
| KR | 2007-0035521 | 3/2007 |

* cited by examiner

*Primary Examiner* — Ricky Mack
*Assistant Examiner* — Vipin Patel
(74) *Attorney, Agent, or Firm* — Innovation Counsel LLP (57) ABSTRACT

A display device includes a first electrode, a second electrode facing the first electrode, a first layer of material disposed between the first electrode and the second electrode, a second layer of material disposed on the first layer of material, and a light source unit emitting blue light incident to the first electrode toward the second electrode. At least one color converting member receives the blue light and generate light having a wavelength different from the wavelength of the blue light. The second layer of material is positioned on the second electrode and is movable along with the second electrode by an attraction force between the first electrode and the second electrode.

23 Claims, 10 Drawing Sheets

DISPLAY DEVICE

CROSS-REFERENCE TO RELATED APPLICATION

This application claims priority to and the benefit of Korean Patent Application No. 10-2007-0108748 filed in the Korean Intellectual Property Office on Oct. 29, 2007, the entire contents of which are incorporated herein by reference.

BACKGROUND OF THE INVENTION (a) Field of the Invention

The present invention relates to a display device. More particularly, the present invention relates to the display device for displaying images by using a difference of refractive indexes between two mediums.

(b) Description of the Related Art

Recently, flat panel displays such as an organic light emitting device (OLED), a plasma display panel (PDP), and a liquid crystal display (LCD) have been widely used.

The LCD is a display device using electro-optical characteristics of liquid crystals in which light transmission amounts are varied according to an applied electric field to thereby realize the display of images, but a viewing angle thereof is narrow and the cost is high. The PDP is a display device for displaying images by using plasma generated by gas discharge, but a large amount of heat is unavoidably generated in the panel by the high temperature discharge gas. In the OLED, electrons and holes are injected into an organic illumination layer respectively from a cathode (the electron injection electrode) and an anode (the hole injection electrode). The injected electrons and holes are combined to generate excitons, which provide illumination when converting from an excited state to a ground state. In such an OLED, only a portion of the injected electric charge provides illumination and the rest is lost as heat.

In additional, a field emission display (FED) utilizing the tunneling effect of quantum mechanics to emit electrons from electron emission sources formed on cathode electrodes may be provided. The emitted electrons strike a phosphor layer formed on an anode electrode to illuminate the phosphor layer and thereby result in the display of images. An electrophoretic display (EPD) is a display device utilizing the electrophoretic phenomenon to repeatedly write or erase information made of symbols such as characters and numbers.

Recently, research efforts have been directed toward producing display devices which are simpler to manufacture, as well as toward improved performance of the above-described display devices. From among these new display devices, an electric blackboard display applying micro electromechanical systems (MEMS) has attracted interest.

SUMMARY OF THE INVENTION

A display device according to an exemplary embodiment of the present invention includes a first electrode, a second electrode facing the first electrode, a first layer of material disposed between the first electrode and the second electrode, a second layer of material disposed on the first layer of material, a light source unit emitting blue light incident to the first electrode toward the second electrode, and at least one color converting member receiving the blue light and generatig light having a wavelength different from the wavelength of the blue light, wherein the second layer of material and the second electrode are movable in response to an attraction force between the first electrode and the second electrode.

A thickness of the first layer of material may be partially eliminated by the movement of the second layer of material. The first layer of material layer may include a layer of air.

The second layer of material may include a material selected from the group consisting of polymer materials. The second layer of material may be a membrane, wherein the membrane may be deflected from an initial state in response to the attraction force generated between the first electrode and the second electrode, and further wherein membrane returns the initial state in an absence of attraction force.

The second layer of material may contact the first electrode by the attraction force between the first electrode and the second electrode, and a refractive index of the second layer of material may be equal to or more than the refractive index of the first electrode.

The display device may further include a spacer comprising at least one opening and that is disposed between the first electrode and the second electrode, wherein the first layer of material may be positioned on the opening.

When the second layer of material contacts the first electrode, the blue light may pass through the second layer of material, and when the second layer of material does not contact the first electrode, the blue light may do not pass through the first layer of material and is totally reflected.

The second electrode may be located on the second layer of material.

The display device may further include an insulating layer formed on the second electrode.

The second electrode may be disposed between the first layer of material and the second material layer.

The display device may include an insulating layer formed under the second electrode.

The display device may further include a membrane located opposite to the second layer of material with reference to the second electrode.

The at least one color converting member may include a first portion formed under the second layer of material and a second portion formed on the membrane. The color converting member may be located on or under the second layer of material.

The second layer of material may be made of a transparent material.

The tt least one color converting member may include a red converting member and a green converting member, the red converting member may convert the blue light into red light and the green converting member may converts the blue light into green light, and an image may be displayed by a combination of the blue light not having been affected by the color converting member, the red light, and the green light.

The red converting member may include one material selected from the group consisting of $CaAlSiN_3:Eu$, $(Sr,Ca)AlSiN_3:Eu$, $Y(V,P)O_4:Eu$, $(Y,Gd)BO_3:Eu$, and combinations thereof.

The green converting member may include one material selected from the group consisting of $(Ba,Sr)_2SiO_4:Eu$, $Ca_3(Sc,Mg)_2Si_3O_{12}:Ce$, $CaSc_2O_4:Ce$, $Zn_2SiO_4:Mn$, $(Zn,A)_2SiO_4:Mn$, and combinations thereof.

The color converting member may include one material selected from the group consisting of polydiacetylene, transacetylene, phosphor, nanocrystal, and quantum dots (CdSe/ZnS, CdS/ZnS, InGaP/ZnS).

The display device may further include a light guide located opposite to the first layer of material with reference to the first electrode, wherein a refractive index of the light guide is equal to or less than a refractive index of the first electrode.

The light source unit may be disposed on the second surface of the light guide vertical to the first surface of the light guide on which the first layer of material is formed.

The light source unit may include a light source, and an overcoat having a reflection member disposed therein and supporting the light source.

The light source unit may be disposed on a groove formed in the light guide. The light source unit may include a light source, and a diffusion member enclosing the light source.

The refractive index of the diffusion member may be greater than a refractive index of the light guide. The diffusion member may be made of a material such as polyurethane, polyethylene, polystyrene, polyvinylchloride, epoxy, and combinations thereof.

The light source may include at least one selected from the group consisting of a light emitting diode (LED), an organic electric field light-emitting device (organic EL), an inorganic electric field light-emitting device (inorganic EL), a cold cathode fluorescent lamp (CCFL), an external electrode fluorescent lamp (EEFL), a discharge lamp (DL), and combinations thereof.

DETAILED DESCRIPTION OF THE EMBODIMENTS

The present invention is described below more fully with reference to the accompanying drawings, in which exemplary embodiments of the invention are shown. The described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A display device according to an exemplary embodiment of the present invention is described in detail below with reference to FIG. 1 and FIG. 2.

Figure 1:
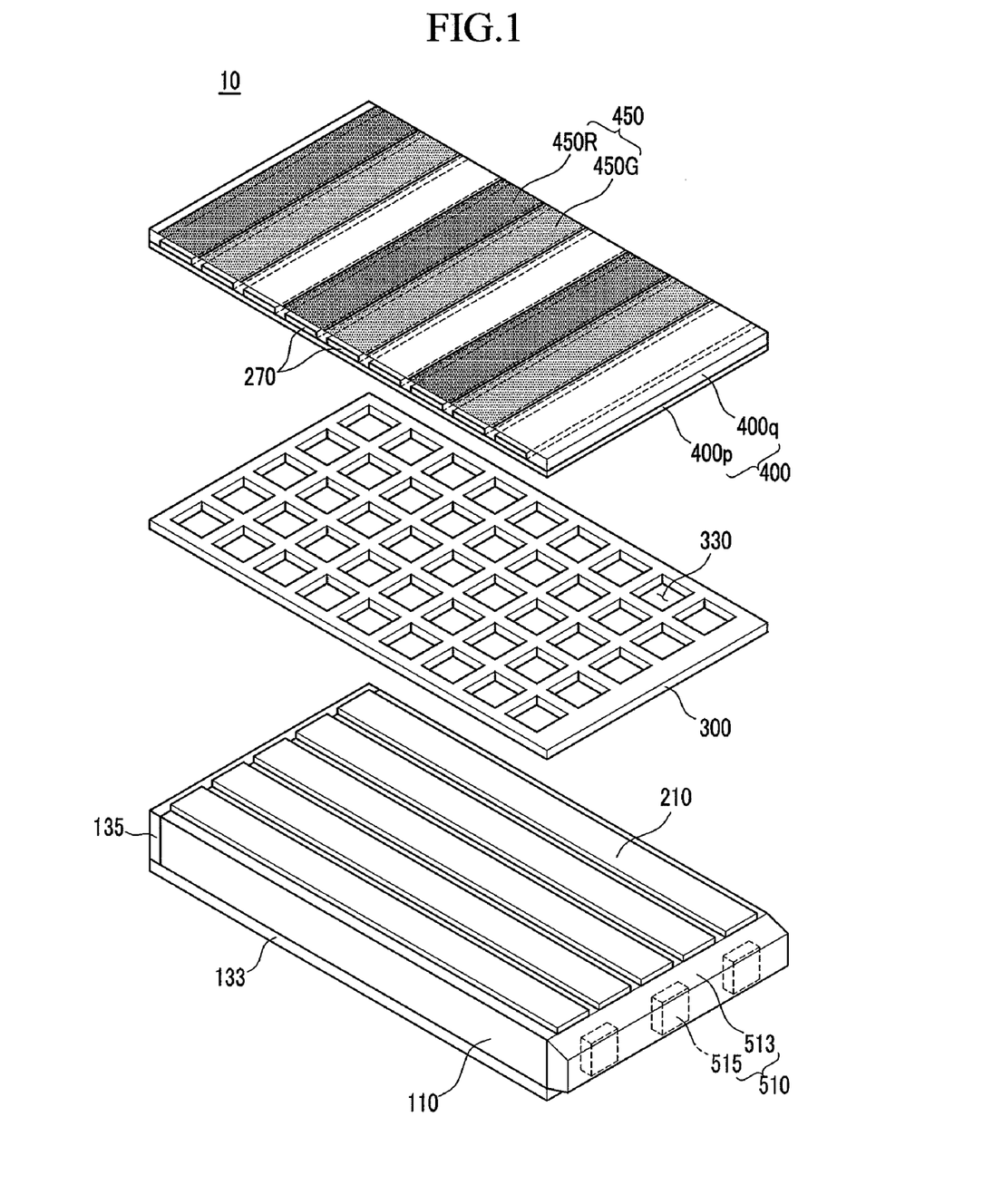
FIG. 1 is a perspective view of a display device according to an exemplary embodiment of the present invention.
Figure 2:
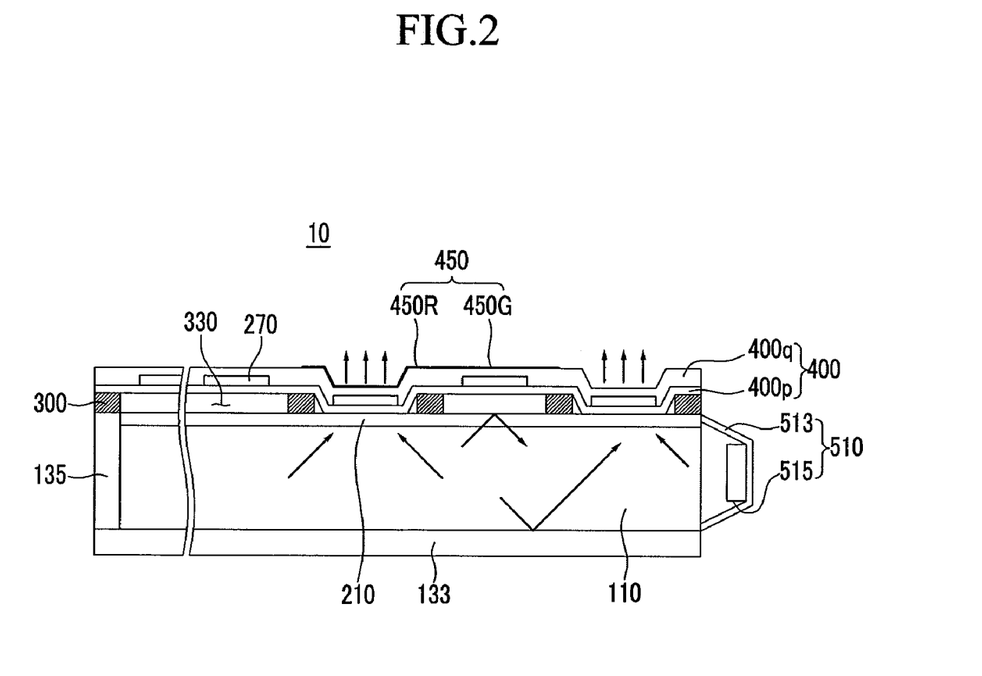
FIG. 2 is a cross-sectional view of a portion of the display device shown in FIG. 1.

FIG. 1 is a perspective view of a display device according to an exemplary embodiment of the present invention, and FIG. 2 is a combination cross-sectional view of the display device shown in FIG. 1.

Referring to FIG. 1 and FIG. 2, a display device 10 includes a plurality of first electrodes 210 and a plurality of second electrodes 270 intersecting each other.

The first electrodes 210 are extended in one direction and are arranged parallel to each other. The second electrodes 270 are extended in a direction intersecting the first electrodes 210 and are arranged parallel to each other.

The first and second electrodes 210 and 270 are preferably formed of a transparent conductive material such as ITO (indium tin oxide) or IZO (indium zinc oxide).

A spacer 300 to form an interval between the first electrodes 210 and the second electrodes 270 is disposed between the first electrodes 210 and the second electrodes 270. The spacer 300 includes a plurality of openings 330 arranged in a matrix shape, and each opening 330 corresponds to a region formed by an overlap at an intersection of the first electrodes 210 and the second electrodes 270. It is preferable that the openings 330 respectively correspond to pixels.

Because the spacer 300 is made of an opaque material, the spacer 300 blocks incident light and the incident light passes through an air layer in the openings 330.

An insulating layer (not shown) may be formed between the spacer 300 and the first electrodes 210.

A membrane 400 is disposed on the second electrodes 270. The membrane 400 is a double-layered structure including a lower membrane 400$p$ and an upper membrane 400$q$. The lower membrane 400$p$ is located between the spacer 300 and the upper membrane 400$q$, and the second electrode 270 is positioned between the lower membrane 400$p$ and the upper membrane 400$q$.

The membrane 400 may be made of a transparent insulating material having elasticity. If the potential difference between the first electrode 210 and the second electrode 270 is generated, an attraction force is formed between the first and second electrodes 210 and 270. Therefore, portions of the second electrodes 270 attached to the membrane 400 moves toward the first electrodes 210 through the openings 330, such that the lower membrane 400$p$ is contacted with the first electrodes 210. If the potential difference between the first electrode 210 and the second electrode 270 eliminated, the membrane 400 may return to the original position by elastic force thereof.

The refractive index of the membrane 400 is equal to or greater than the refractive index of the first electrode 210. The membrane 400 may be made of a polymer material. For example, polydimethyl siloxane (PDMS), polyethylene naphthalate (PEN) and polyethylene terephthalate (PET) may be used.

One of the lower membrane 400$p$ and the upper membrane 400$q$ may be omitted, and when the lower membrane 400$p$ is omitted, an insulator may be formed between the first electrode 210 and the second electrode 270, that is, on the first electrode 210 or under the second electrode 270 to prevent a short between the first and second electrodes 210 and 270.

A light guide 110 is disposed under the first electrode 210 to guide incident light in the direction of the membrane 400. The light guide 110 may be made of polymethyl methacrylate (PMMA), polycarbonate (PC), or glass.

The refractive index of the light guide 110 is equal to or less than the refractive index of the first electrode 210. Because the refractive index of the first electrode 210 is equal to or less than the refractive index of the membrane 400, the refractive index of the light guide 110 is equal to or less than the refractive index of the membrane 400. On the other hand, because the first electrode 210 is thin, when the refractive index is not considered, the refractive index of the light guide 110 is equal to or less than the refractive index of the membrane 400.

A plurality of reflectors 133 and 135 are provided on the lower surface and the side surface of the light guide 110, respectively, and they again guide the outgoing light to the direction of the membrane 400 to reduce light loss.

A light source unit 510 is provided on the lateral surface of the light guide 110, and the blue light is irradiated to the light guide 110. The light source unit 510 includes at least one light source 515 and an overcoat 513 covering the light source 515. An example of the light source 515 may be a blue light emitting diode (LED). A reflection member (not shown) to guide the light irradiated from the light source 515 to the light guide 110 is formed in the inner part of the overcoat 513.

The light source 515 may be a cold cathode fluorescent lamp (CCFL) of a blue color, a fluorescent lamp such as an external electrode fluorescent lamp (EEFL), or a discharge lamp (DL) of a blue color as a substitute for the blue light emitting diode.

Figure 8:
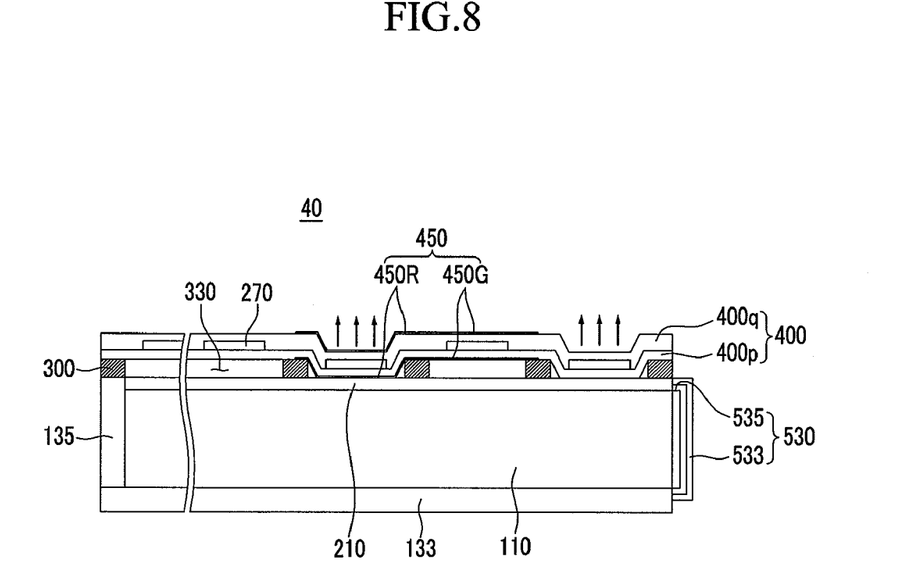

A plurality of color converting members 450 are formed on the membrane 400. The color converting members 450 have almost the same shape and arrangement as the second electrodes 270. The color converting members 450 may be made of polydiacetylene, transacetylene, phosphor, nanocrystals, or quantum dots (CdSe/ZnS, CdS/ZnS, InGaP/ZnS, etc.). On the other hand, as shown in FIG. 8, the color converting members 450 may be formed on the upper surface and the lower surface of the membrane 400. Also, the membrane 400 and the color converting members 450 may be formed as one body.

The color converting members 450 include a plurality of red converting members 450R and a plurality of green converting members 450G, but blue members are not separately included. The color converting members 450 are not disposed on the regions where the blue converting members will be formed.

The red converting members 450R absorbs the blue light irradiated from the light source unit 510 such that the red light is emitted by the energy obtained through the absorption, and the green converting member 450G emits the green light through the energy obtained through the absorption of the blue light. The red and green light obtained by this method as well as the blue light passing through the regions where the color converting members 450 do not exist are used to display the desired images. Accordingly, because the display device 10 according to the present exemplary embodiment does not need the blue converting members to generate visible light of a blue color, the structure of the display device 10 and the manufacturing process thereof may be simplified and the manufacturing cost of the display device 10 may be reduced.

Each red converting member 450R may include a material selected from the group consisting of $CaAlSiN_3$:Eu, $(Sr,Ca)AlSiN_3$:Eu, $Y(V,P)O_4$:Eu, $(Y,Gd)BO_3$:Eu, and combinations thereof, and each green converting member 450G may include a material selected from the group consisting of $(Ba,Sr)_2SiO_4$:Eu, $Ca_3(Sc,Mg)_2Si3O_{12}$:Ce, $CaSc_2O_4$:Ce, $Zn_2SiO_4$:Mn, $(Zn,A)_2SiO_4$:Mn, and combinations thereof.

The composition for the formation of the color converting members 450 is manufactured by dispersing a material with a controlled stoichiometric ratio in a vehicle in which a binder resin is dissolved with a solvent. Examples of the binder resin may include a cellulose resin an acryl resin such as ethyl cellulose, but they are not limited thereto. The solvent may be an organic solvent such as hexanetriol, polypropylene glycol, butyl carbitol acetate, terpineol, but is not limited thereto. Also, since the manufacture of the composition for the formation of the color converting members 450 is only one example, the manufacturing method of the composition is not limited thereto.

The color converting members 450 may be formed by manufacturing the composition with a desired shape through various methods such as photolithography, screen printing, inkjet printing, and laser printing.

Figure 3:
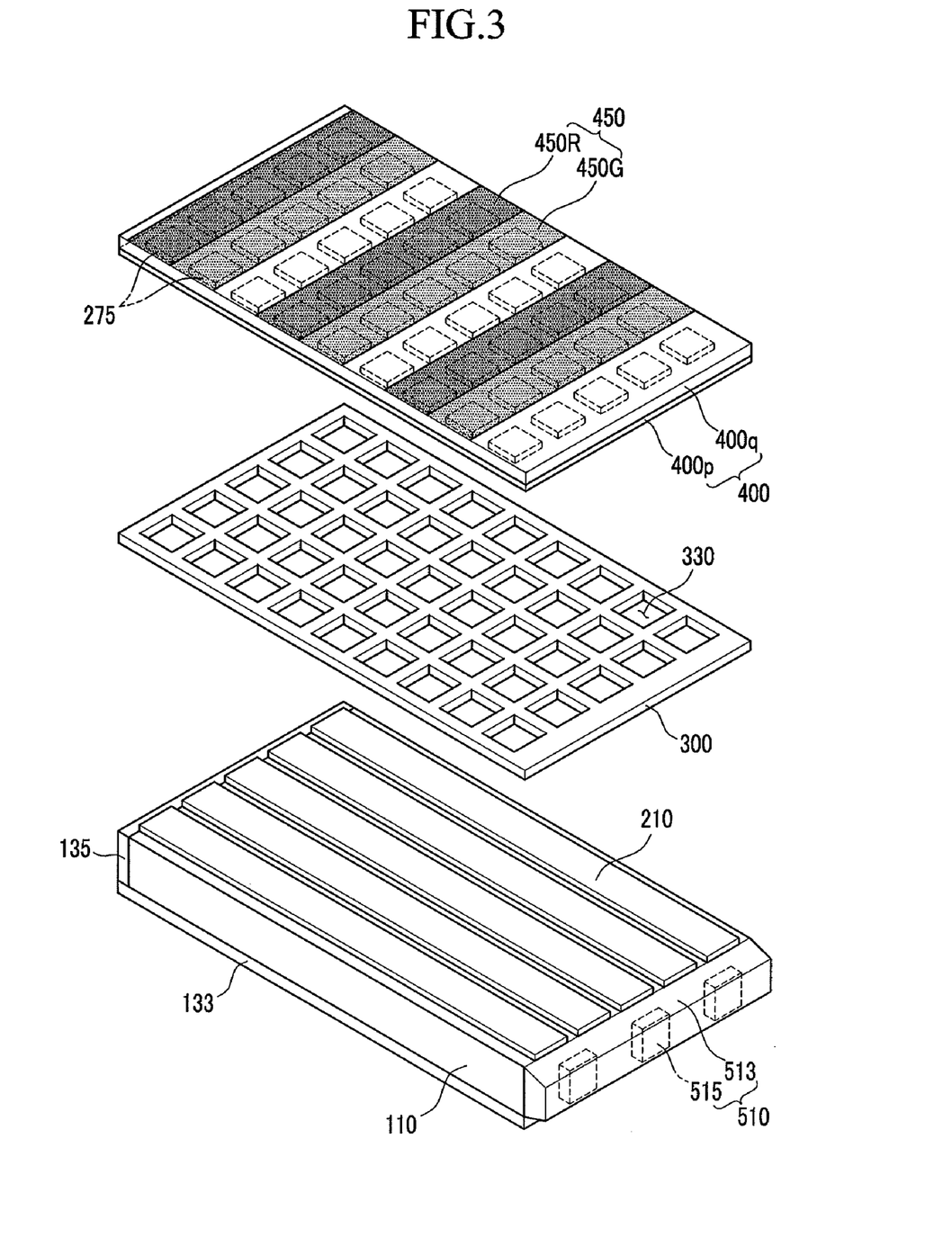
FIG. 3 is a perspective view showing a different shape of the electrode shown in FIG. 1, FIG. 4 and FIG. 5 are views for explaining a driving method of the display device shown in FIG. 1, FIG. 6 to FIG. 9 are cross-sectional views of display devices according to other exemplary embodiments of the present invention.

Further, the second electrodes 275 are not necessarily bar-shaped as shown in FIG. 3, but may be formed with a shape corresponding to each opening 330 (hereafter, the second electrodes are referred to as "pixel electrodes"). In this case, a switching element (not shown) that is connected to each pixel electrode 275 for independently switching the voltage applied to the pixel electrode 275 may be provided. The switching element may be a thin film transistor, and gate lines (not shown) transmitting scanning signals for turning on/off the thin film transistors and data lines (not shown) transmitting data voltages applied to the pixel electrodes 275 may be formed on the membrane 400. Each thin film transistor may include a gate electrode, a source electrode, a drain electrode, and a semiconductor. Accordingly, the voltage applied to each pixel electrode 275 may be accurately controlled, and portions of the membrane 400 may easily contact with and be separated from the first electrodes 210.

Next, a driving method of the display device 10 having the structure shown in FIG. 1 and FIG. 2 is described in detail with reference to FIG. 4 and FIG. 5.

The light sources 515, the first electrodes 210, and the second electrodes 270 are controlled by a driver (not shown), and they receive signals through the signal lines connected to the driver.

Each light source 515 emits the blue light, and the light guide 110 guides the incident blue light in the direction of the membrane 400. A reflection member and a plurality of reflectors 133 and 135 formed in the overcoat 513 reflect the blue light progressing in the directions to the sides of the membrane 400 to guide the blue light in the direction of the membrane 400.

Figure 4:
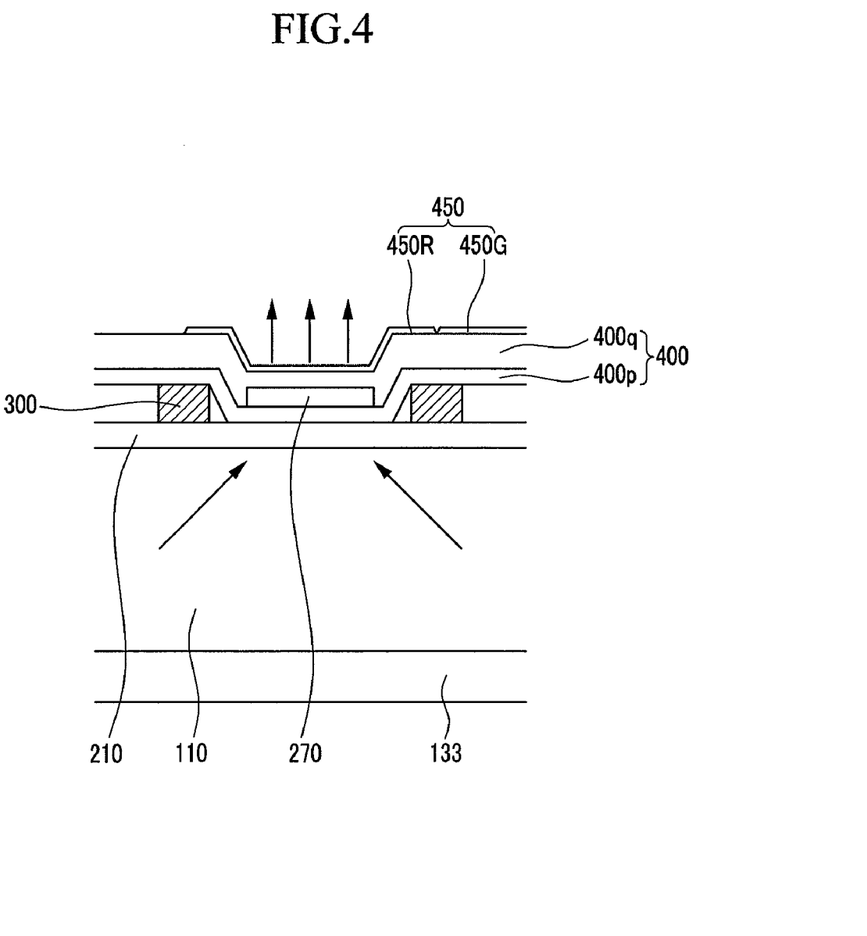

As shown in FIG. 4, if enough potential difference is generated between the first electrode 210 and the second electrode 270, an attraction force generated between the electrodes 210 and 270 by the potential difference moves the membrane 400 such that the membrane 400 contacts the first electrode 210. Here, because the refractive index of the membrane 400 is equal to or larger than the refractive index of the first electrode 210 and the light guide 110, the blue light passes through the light guide 110 and the first electrode 210, and then passes through the membrane 400 that contacts the first electrode 210. The blue light incident to the membrane 400 is absorbed to the color converting member 450 such that the red or green light is generated, or passes through the membrane 400.

Figure 5:
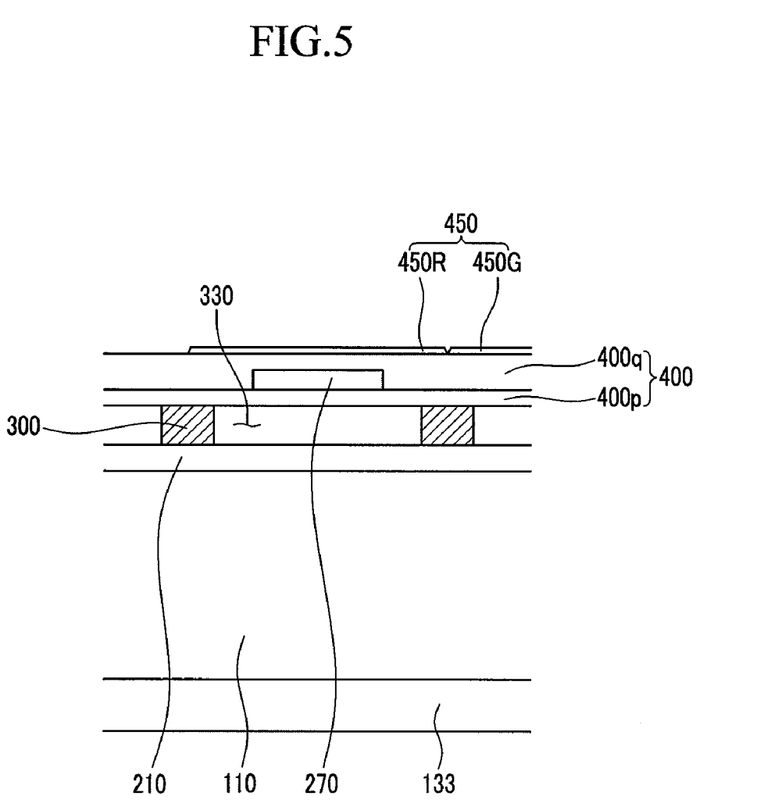

On the other hand, as shown in FIG. 5, if not enough potential difference is generated between the first electrode 210 and the second electrode 270, the membrane 400 maintains a horizontal state and an air layer remains between the membrane 400 and the first electrode 210. Here, because the refractive index of the light guide 110 and the first electrode 210 is larger than the refractive index of the air layer, the blue light incident to the air layer from the light guide 110 and the first electrode 210 does not pass through the air layer and is totally reflected. To generate the total reflection, the incident angle of the blue light must be larger than the threshold angle, and this may be obtained by appropriately controlling the positions of the light sources 515, the height and the length of the light guide 110, etc.

Accordingly, in the display device 10 according to the present exemplary embodiment, the turning on/off of the pixels is controlled by using the attraction force generated by applying the voltage between the first and second electrodes 210 and 270, the elastic force of the membrane 400, and the difference between the refractive indexes between two mediums.

Next, display devices according to another exemplary embodiment of the present invention are described below in detail with reference to FIG. 6 and FIG. 7.

Figure 6:
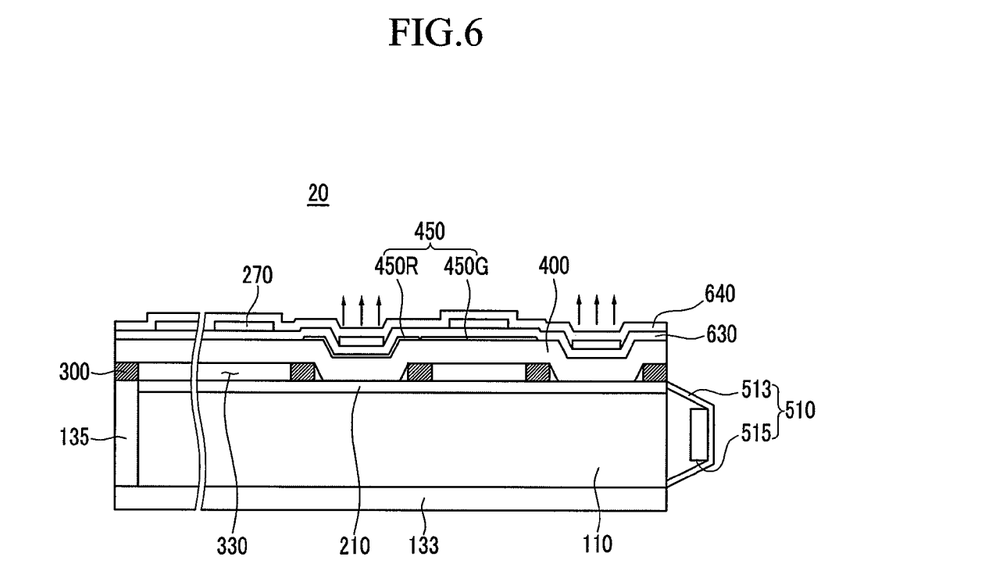
Figure 7:
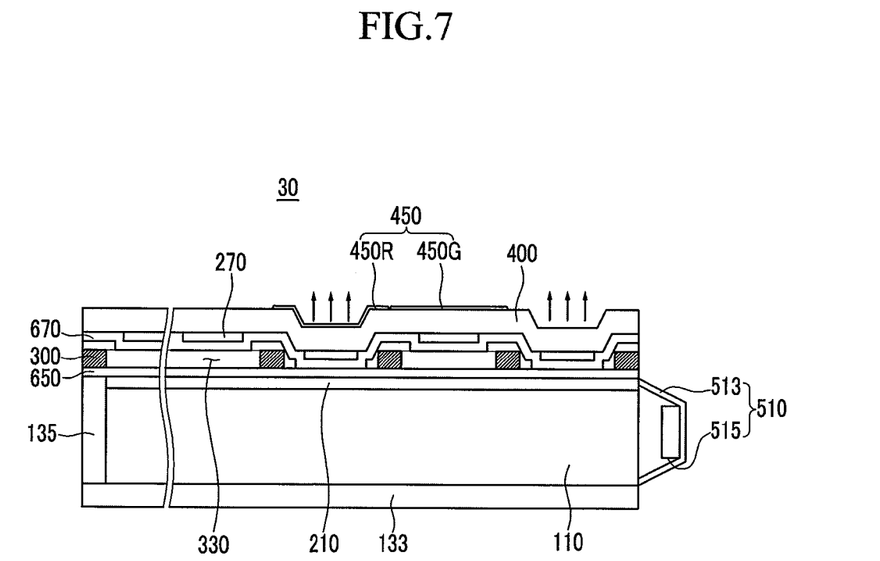

FIG. 6 and FIG. 7 are cross-sectional views of display devices according to other exemplary embodiments of the present invention.

Referring to FIG. 6, a display device 20 according to the present exemplary embodiment includes a plurality of first electrodes 210 and a plurality of second electrodes 270, a spacer 300, a membrane 400, a light guide 110, a light source unit 510, and a plurality of color converting members 450.

The structures of the light source unit 510, the light guide 110, and the spacer 300 according to the present exemplary embodiment are almost the same as the structures of the exemplary embodiment shown in FIG. 1 and FIG. 2.

The light source unit 510 is provided on a side surface of the light guide 110, and includes at least one light source 515 and an overcoat 513. A plurality of reflectors 133 and 135 are provided on the lower surface and the side surface of the light guide 110, respectively. The first electrodes 210 are formed on the light guide 110. The spacer 300 having a plurality of openings 330 is disposed on the first electrodes 210. The membrane 400 is arranged on the spacer 300.

However, the membrane 400 of the display device 20 according to the present exemplary embodiment has a single-layered structure, differently from the display device 10 shown in FIG. 1 and FIG. 2. The color converting members 450 are formed on the membrane 400. The membrane 400 and the color converting member 450 may be made as one body. The color converting members 450 include red converting members 450R and green converting members 450G. Blue light emitted from the light source unit 510 may be used as above to display images, and the color converting members 450 additionally include blue converting members. The first insulating layer 630 is formed on the membrane 400 and the color converting members 450. The second electrodes 270 are formed on the first insulating layer 630, and the second electrodes 270 are arranged in a direction substantially intersecting the first electrodes 210. The second insulating layer 640 for protecting them is formed on the second electrodes 270.

Many characteristics of the exemplary embodiment as shown in FIG. 1 and FIG. 2 may be adapted to the present exemplary embodiment.

Referring to FIG. 7, a display device 30 according to the present exemplary embodiment has almost the same structure as the exemplary embodiment as shown in FIG. 6. However, in the display device 30 according to the present exemplary embodiment, a first insulating layer 650 is formed on the first electrodes 210, differently from the display device 20 shown in FIG. 6. The second electrodes 270 have a surface corresponding to the lower surface of the membrane 400, that is, corresponding to the spacer 300. A second insulating layer 670 is formed on the second electrodes 270.

Next, display devices according to other exemplary embodiments of the present invention are described below in detail with reference to FIG. 8 to FIG. 11.

FIG. 8 to FIG. 11 are cross-sectional views of display devices according to other exemplary embodiments of the present invention.

Referring to FIG. 8, the display device 40 according to the present exemplary embodiment includes a plurality of first electrodes 210 and a plurality of second electrodes 270, a spacer 300, a membrane 400, a plurality of color converting members 450, a light guide 110, and a light source unit 530.

The structures of the light guide 110, the first and second electrodes 210 and 270, the spacer 300, and the membrane 400 of the present exemplary embodiment are almost the same as those of the exemplary embodiment shown in FIG. 1 and FIG. 2.

The first electrodes 210 are formed on the light guide 110. The spacer 300 having a plurality of openings 330 is disposed on the first electrodes 210. The membranes 400 having a double-layered structure of a lower membrane $400p$ and an upper membrane $400q$ are formed on the spacer 300. The second electrodes 270 are located between the lower membrane $400p$ and the upper membrane $400q$. The color converting members 450 are formed on the membranes 400.

However, in the display device 40 according to the present exemplary embodiment, the color converting members 450 are also formed on the lower surface of the membranes 400, differently from the display device 10 shown in FIG. 1 and FIG. 2. Like the upper surface of the membrane 400, the color converting members 450 include red converting members 450R and green converting members 450G. The red converting members 450R/green converting members 450G disposed on the lower surface of the membrane 400, and the red converting members 450R/green converting members 450G disposed on the upper surface of the membrane 400 are located at corresponding positions. The light source unit 530 is provided on the side surface of the light guide 110, and irradiates blue light to the light guide 110. The light source unit 530 includes at least one light source 535 and an overcoat 533 covering it. The light source 535 may be an organic electric field light-emitting device (organic EL) or an inorganic electric field light-emitting device (inorganic EL) of which the volume is small and is light, compared with other light sources. A reflection member to guide the light emitted from the light source 535 toward the light guide 110 may be formed in the overcoat 533.

A plurality of reflectors 133 and 135 are provided on the lower surface and the side surface of the light guide 110, respectively.

Accordingly, differently from the exemplary embodiments shown in FIG. 1 to FIG. 4, the volume of the light source unit 530 may be reduced such that the size of the display device 40 may be remarkably reduced.

Many characteristics of the exemplary embodiment shown in FIG. 1 and FIG. 2 may be adapted to the present exemplary embodiment.

Figure 9:
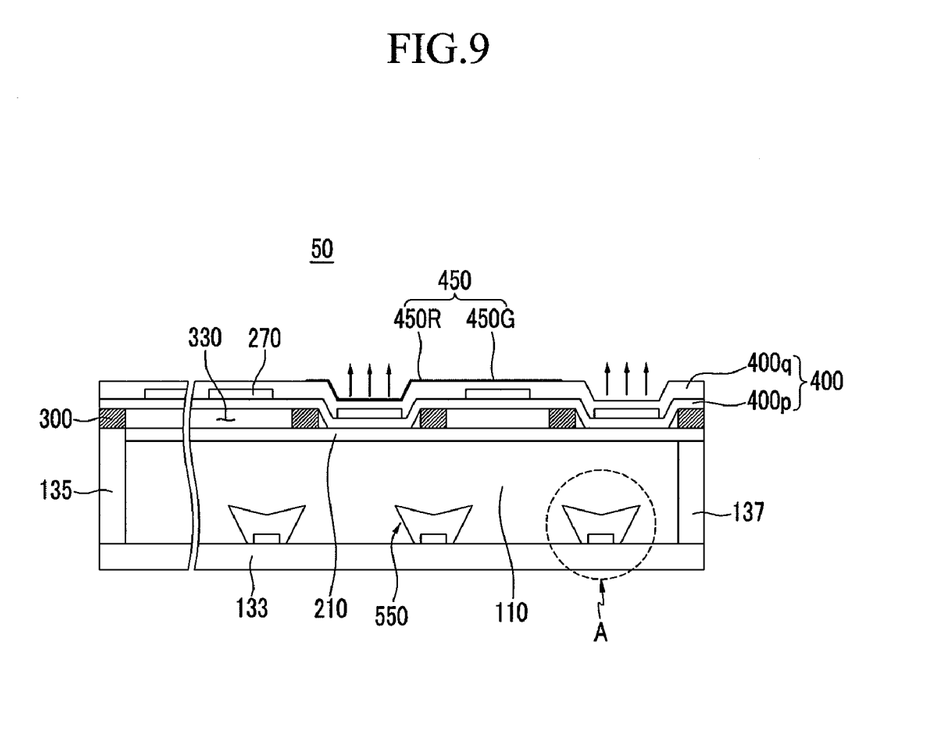

Referring to FIG. 9, a display device 50 according to the present exemplary embodiment includes a plurality of first electrodes 210 and a plurality of second electrodes 270, a spacer 300, membranes 400, a plurality of color converting members 450, a light guide 110, and a plurality of light source units 550.

The structure of the light guide 110, the first and second electrodes 210 and 270, the spacer 300, the membranes 400, and the color converting members 450 according to the present exemplary embodiment are almost the same as those of the exemplary embodiment shown in FIG. 1 and FIG. 2.

The first electrodes 210 are formed on the light guide 110. The spacer 300 including a plurality of openings 330 is formed on the first electrodes 210. The membrane 400 including the lower membrane $400p$ and the upper membrane $400q$ is formed on the spacer 300. The second electrodes 270 are formed between the lower membrane $400p$ and the upper membrane 400q. The color converting members 450 are formed on the membrane 400. The color converting members 450 include red converting members 450R and green converting members 450G, but blue converting members are not additionally included.

In the display device 50 according to the present exemplary embodiment, the light source units 550 are located in grooves formed in the light guide 110, respectively, differently from the display device 10 shown in FIG. 1 and FIG. 2. Each groove has a shape corresponding to the shape of each light source unit 550 and is disposed on the lower surface of the light guide 110. The shape of the grooves may be changed according to the shape of the light source units 550. The reflector 133 is located under the lower surface of the light guide 110. The reflectors 135 and 137 are disposed on both side surfaces of the light guide 110, respectively.

Figure 10:
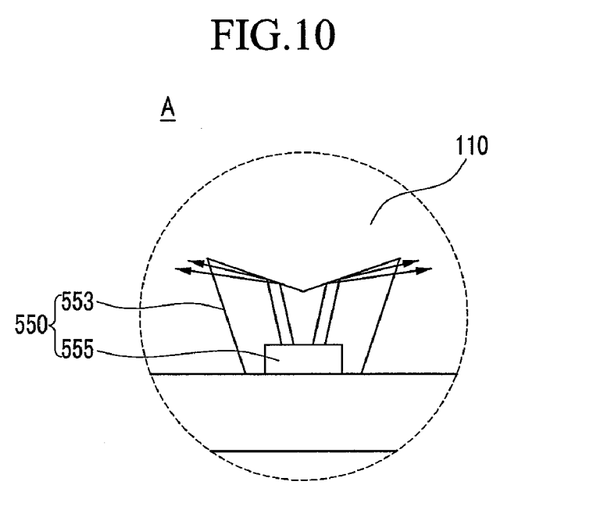
FIG. 10 is an enlarged view of the light source unit shown in FIG. 9.

FIG. 10 is an enlarged view of an A region shown in FIG. 9, and referring to FIG. 10, one light source unit 550 includes a light source 555 and a diffusion member 553.

A blue light emitting diode (LED), a fluorescent lamp such as a cold cathode fluorescent lamp or an external electrode fluorescent lamp of a blue color, or a discharge lamp of a blue color may be used as the light source 555. Also, an organic electric field light-emitting device (organic EL) or an inorganic electric field light-emitting device (inorganic EL), may be used.

The diffusion member 553 encloses the light source 555, and the refractive index of the diffusion member 553 is larger than the refractive index of the light guide 110. The diffusion member 553 may be made of a material such as polyurethane, polyethylene, polystyrene, polyvinylchloride, epoxy, or combinations thereof. The diffusion member 553 functions such that the light emitted from the light source 555 diffuses into the side surface, and it is preferable that the amount of light diffused to the side of the light source 555 is greater than about 70% of the emitted light from the light source 555. The shape of the diffusion members 553 may be variously changed. The diffusion member 553 according to the present exemplary embodiment has a side surface that is inclined with reference to a vertical line, and the upper portion includes a depressed surface.

Figure 11:
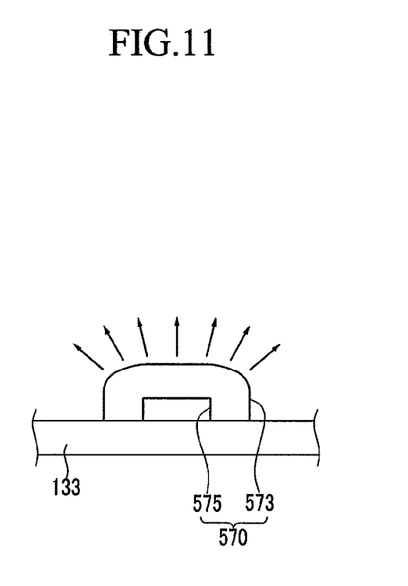
FIG. 11 is a view showing an alternative light source unit suitable for use in a display such as that shown in FIG. 9.

As FIG. 11 shows a modification example of the light source unit 550 shown in FIG. 10, referring to FIG. 11, a diffusion member 573 covering a light source 575 of a light source unit 570 of the modification example may have approximately a hemispherical shape.

Accordingly, because the light source units 550 and 570 do not take up additional space and are located in grooves of the light guide 110, the size of the display device 50 may be reduced. Also, because the light source units 550 and 570 include the diffusion members 553 and 573, respectively and are disposed on the wide lower surface rather than the narrow surface of the light guide 110, a plurality of light source units 550 and 570 may be easily designed. Particularly, when a large display device is produced, a large number of light sources are required to maintain uniform luminance, so the light source units 550 and 570 may be provided on the grooves formed on the wide lower surface of the light guide 110 and the light source units 550 and 570 having an amount of diffused light of more than about 70% may be adjusted to thereby maintain uniform luminance over the entire screen.

Many characteristics of the exemplary embodiment shown in FIG. 1 and FIG. 2 may be adapted to the present exemplary embodiment.

According to an exemplary embodiment of the present invention, a light source unit emitting blue light is used such that it is not necessary for blue converting members to be provided, thereby reducing the manufacturing cost of the display device. Further, the turning on/off of the pixels is controlled by using a difference between the refractive index of two mediums such that the structure of the display device may be simplified, and the manufacturing process of the display device may be shortened and simplified.

Also, according to an exemplary embodiment of the present invention, the light source unit is provided on the grooves formed in the light guide such that the size of the display device may be reduced. Further, the light source unit including the diffusion member is disposed on the wide lower surface of the light guide such that a plurality of light source units may be designed without hardship.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a first electrode;
a second electrode facing the first electrode;
a first layer of material disposed between the first electrode and the second electrode;
a second layer of material disposed on the first layer of material;
a light source unit emitting blue light incident to the first electrode toward the second electrode; and
at least one color converting member receiving the blue light and generating light comprising a wavelength different from the wavelength of the blue light,
wherein the second layer of material is in contact with the second electrode and is movable in response to an attraction force between the first electrode and the second electrode;
wherein the second electrode is disposed between the first layer of material and the second layer of material, and
wherein the second layer of material is disposed between the second electrode and the at least one color converting member and is made of a different material from the at least one color converting member.

2. The display device of claim 1, wherein a thickness of the first layer of material is partially eliminated by the movement of the second layer of material.

3. The display device of claim 2, wherein the first layer of material comprises a layer of air.

4. The display device of claim 2, wherein the second layer of material comprises a material selected from the group consisting of polymer materials.

5. The display device of claim 1, wherein the second layer is deflected from an initial state in response to the attraction force generated between the first electrode and the second electrode, and further wherein the second layer returns to the initial state in an absence of attraction force.

6. The display device of claim 5, wherein a refractive index of the second layer of material is equal to or greater than a refractive index of the first electrode.

7. The display device of claim 6, further comprising a spacer comprising at least one opening, the spacer being disposed between the first electrode and the second electrode, wherein the first layer of material is positioned in the opening.

8. The display device of claim 7, wherein when the second layer is deflected from the initial state in response to the attraction force generated between the first electrode and the second electrode, the blue light passes through the second layer of material, and when the second layer of material is in the initial state, the blue light does not pass through the first layer of material and is totally reflected.

9. The display device of claim 1, wherein the second electrode is a membrane.

10. The display device of claim 9, further comprising another membrane disposed between the first layer of material and the second electrode.

11. The display device of claim 1, further comprising an insulating layer formed under the second electrode.

12. The display device of claim 1, further comprising a membrane disposed between the first layer of material and the second electrode.

13. The display device of claim 1, wherein the at least one color converting member comprises a red converting member and a green converting member, and the red converting member converts the blue light into red light and the green converting member converts the blue light into green light, and an image is displayed by a combination of the blue light not having been affected by the color converting member, the red light, and the green light.

14. The display device of claim 13, wherein the red converting member comprises one material selected from the group consisting of CaAlSiN3:Eu, (Sr,Ca)AlSiN3:Eu, Y(V,P)O4:Eu, (Y,Gd)BO3:Eu, and combination thereof.

15. The display device of claim 13, wherein the green converting member comprises one material selected from the group consisting of (Ba,Sr)2SiO4:Eu, Ca3(Sc,Mg)2Si3O12:Ce, CaSc2O4:Ce, Zn2SiO4:Mn, (Zn,A)2SiO4:Mn, and combination thereof.

16. The display device of claim 1, wherein the color converting member comprises one material selected from the group comprising of polydiacetylene, transacetylene, phosphor, nanocrystal, and quantum dots (CdSe/ZnS, CdS/ZnS, InGaP/ZnS).

17. The display device of claim 1, further comprising
a light guide located opposite to the first layer of material with reference to the first electrode, wherein a refractive index of the light guide is equal to or less than a refractive index of the first electrode.

18. The display device of claim 17, wherein the light source unit is disposed on a groove formed in the light guide.

19. The display device of claim 18, wherein the light source unit comprises:
a light source, and
a diffusion member enclosing the light source.

20. The display device of claim 19, wherein a refractive index of the diffusion member is greater than a refractive index of the light guide.

21. The display device of claim 1, wherein the light source unit includes at least one light source selected from the group consisting of a light emitting diode (LED), an organic electric field light-emitting device (organic EL), an inorganic electric field light-emitting device (inorganic EL), a cold cathode fluorescent lamp (CCFL), an external electrode fluorescent lamp (EEFL), a discharge lamp (DL), and combinations thereof.

22. A display device comprising:
a first electrode;
a second electrode facing the first electrode;
a first layer of material disposed between the first electrode and the second electrode;
a second layer of material disposed on the first layer of material;
a light source unit emitting blue light incident to the first electrode toward the second electrode; and
at least one color converting member receiving the blue light and generating light comprising a wavelength different from the wavelength of the blue light,
wherein the second layer of material is in contact with the second electrode and is movable in response to an attraction force between the first electrode and the second electrode;
wherein the second electrode is disposed between the first layer of material and the second layer of material, and
wherein the at least one color converting member comprises a first portion formed under the second layer of material and a second portion formed on the second layer of material.

23. A display device comprising:
a first electrode;
a second electrode facing the first electrode;
a first layer of material disposed between the first electrode and the second electrode;
a second layer of material disposed on the first layer of material;
a light source unit emitting blue light incident to the first electrode toward the second electrode; and
at least one color converting member receiving the blue light and generating light comprising a wavelength different from the wavelength of the blue light,
wherein the second layer of material is in contact with the second electrode and is movable in response to an attraction force between the first electrode and the second electrode,
and
wherein the at least one color converting member is located between the first electrode and the second electrode.

* * * * *